United States Patent [19]

Weber

[11] Patent Number: 4,467,398

[45] Date of Patent: Aug. 21, 1984

[54] UNIT PLUG

[75] Inventor: Edwin Weber, Gärtringen, Fed. Rep. of Germany

[73] Assignee: Kautt & Bux KG, Fed. Rep. of Germany

[21] Appl. No.: 391,708

[22] Filed: Jun. 24, 1982

[30] Foreign Application Priority Data

Jul. 10, 1981 [DE] Fed. Rep. of Germany ....... 3127306

[51] Int. Cl.[3] ................................................ H02B 1/04

[52] U.S. Cl. ........................................ 361/331; 337/11

[58] Field of Search ........................ 337/11, 10, 8, 1, 4; 200/50 R; 361/356, 357, 360, 331

[56] References Cited

U.S. PATENT DOCUMENTS 1,040,381 10/1912 Morrell .............................. 361/360

3,965,397 6/1976 Pearsall, Jr. ......................... 361/331

4,394,706 7/1983 Crafts ................................. 361/331

*Primary Examiner*—Harold Broome

*Attorney, Agent, or Firm*—Wigman & Cohen

[57] ABSTRACT

A unit plug which is combined with a voltage selector and a fuse supporting device to form one component is disclosed which has, as a voltage selector, a roller-like pressure hull adjustable in different angular positions and contact pieces movable against the force of springs which, depending upon the angular position of the pressure hull, are held in different combinations by the pressure hull resting against counter-contact pieces assigned to them. The fuse supporting device is provided with at least one exchangeable fuse holder for a fine-wire fuse as well as with contact pieces which rest against the contact caps of the fine-wire fuse when the fuse holder is inserted.

19 Claims, 5 Drawing Figures

UNIT PLUG

BACKGROUND OF THE INVENTION

The present invention concerns a unit plug which is combined with a voltage selector and a fuse supporting device to form a single component.

Known unit plugs of this type have the disadvantage that only a fuse of a particular size and design can be placed into the fuse supporting device. Furthermore, the selection of the voltage is cumbersome because it is necessary to insert a printed circuit board into the voltage selector assigned to the desired voltage in order to make the necessary switching connections.

The present invention provides a unit plug, which is combined with a voltage selector and a fuse supporting device to form one component. This results in an improved design which is easier to use as well as to handle.

SUMMARY AND OBJECTS OF THE INVENTION

In order to overcome the disadvantages described above, the voltage selector of the present invention has a roller-like pressure hull for the auctation of movable contact pieces which can be adjusted in different angular positions. The contact pieces are designed to interact with counter-contact pieces. Due to this design, only pressure hull need be put into the corresponding angular position in order to set the voltage in which all the movable contact pieces rest against the counter-contact pieces assigned to them which must be selected for setting the desired voltage and brought into their closed position. The replacement of a fuse is also easily accomplished because the fuse supporting device has at least one exchangeable fuse holder. This fuse holder may be designed in such a way that it can receive fine-wire fuses of different shape and size. Preferably, different fuse holders with the same outside dimensions are provided for different shapes and sizes. After having been equipped with a fine-wire fuse, these fuse holders need only be inserted into the fuse supporting device because it has contact pieces which make the necessary connections with the fuse, as is also the case with differently designed fuse holders.

In order to make sure that the component requires as little space as possible and can be mounted in a simple manner, a preferred embodiment uses a common casing with chambers to receive the contact elements which can be coupled with a unit plug socket, the fuse supporting device and the voltage selector. For safety reasons, a cover is provided which at least partially closes the chambers for the fuse supporting device and the voltage selector. A locking system may be provided which permits opening the cover only when no unit plug socket is inserted in the unit plug. Such a locking device is implemented by means of a projection on the cover which is pivoted on the casing in a preferred embodiment and which, when the cover is opened, swings into the chamber containing the contact elements and therefore permits the opening of the cover only when no unit socket plug is coupled with the unit plug.

In order to eliminate as much complexity as possible in the design of the voltage selector, in a preferred embodiment, the movable contact pieces are designed as elastic contact tongues. In their closed position, the tongues exert a force directed against the cover on the pressure hull. The pressure hull then can rest against the cover and requires no support for receiving the return force of the contact tongues.

In a preferred embodiment, the chamber of the casing for the fuse supporting device is designed to receive two fuse holders arranged next to each other. If the pair of contacts required for each fuse holder for contacting the fuse is provided, two lines can then be protected by fuses or the other fuse holder can be used to receive a stand-by fuse or another fuse of different design or size. In order to make sure that there is good contact between the fuses and the contact pieces of the fuse supporting device, a spring is advantageously provided on each fuse holder which pushes the fuse holder, together with the fuse, against the contact pieces.

A particularly compact design can be achieved when the chamber for the fuse supporting device is located between the chamber for the voltage selector and the chamber receiving the unit socket plug. Furthermore, with a view towards good accessibility to the fuse holders, it is advantageous to arrange the fuse holders next to each other in the chamber receiving them with their longitudinal axis in parallel to the direction of the insertion of the unit socket plug.

With these and other objects, advantages and features of the invention that may become hereinafter apparent, the nature of the invention may be more clearly understood by reference to the following detailed description of the invention, the appended claims and to the several drawings attached herein.

DETAILED DESCRIPTION OF THE PREFERRED EMBODIMENT

Figures 1, 3:
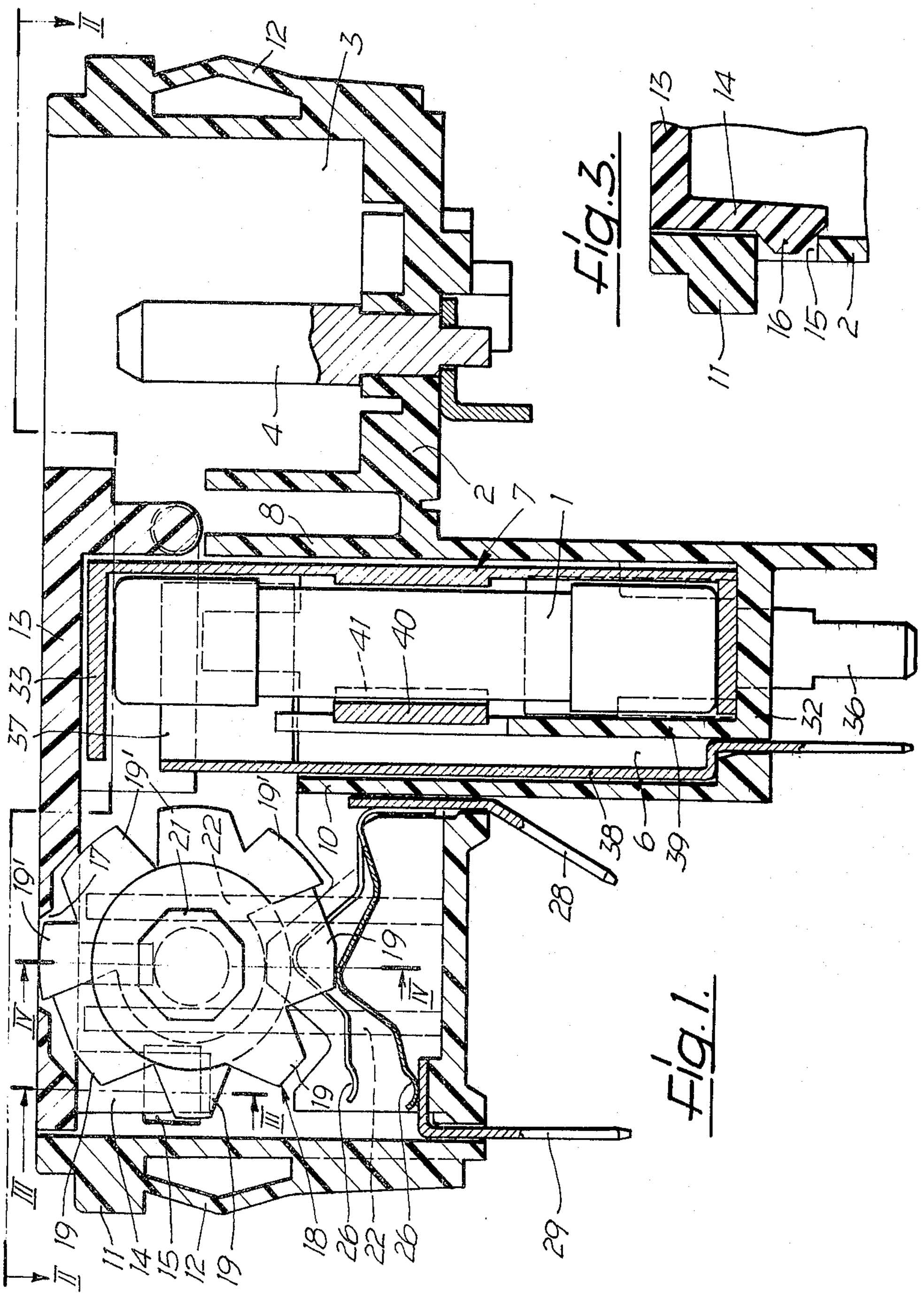
FIG. 1 is a longitudinal cross-section diagram of a preferred embodiment along line I—I of FIG. 2.
FIG. 3 is a cross-section diagram along line III—III of FIG. 1.

Referring now in detail to the drawings wherein like parts are designated by like reference numerals throughout, there is shown in FIG. 1 a component with a unit plug, a voltage selector and a supporting device for fine-wire fuses 1. The component has a common casing 2 which consists of plastic material and forms three chambers in a preferred embodiment. The first chamber 3 has the shape that is customary for unit plugs and contains three flat contact pins 4 in the customary arrangement. These contact pins 4 are placed perpendicularly on the bottom of the chamber which forms a portion of the bottom of the casing 2 and projects outwards towards the open chamber side into the chamber 3. The ends of the flat contact pins 4 penetrating the chamber bottom are rigidly connected with a connecting square or such which rests against the outside of the chamber bottom and thus fixes the flat contact pin 4.

Figure 2:
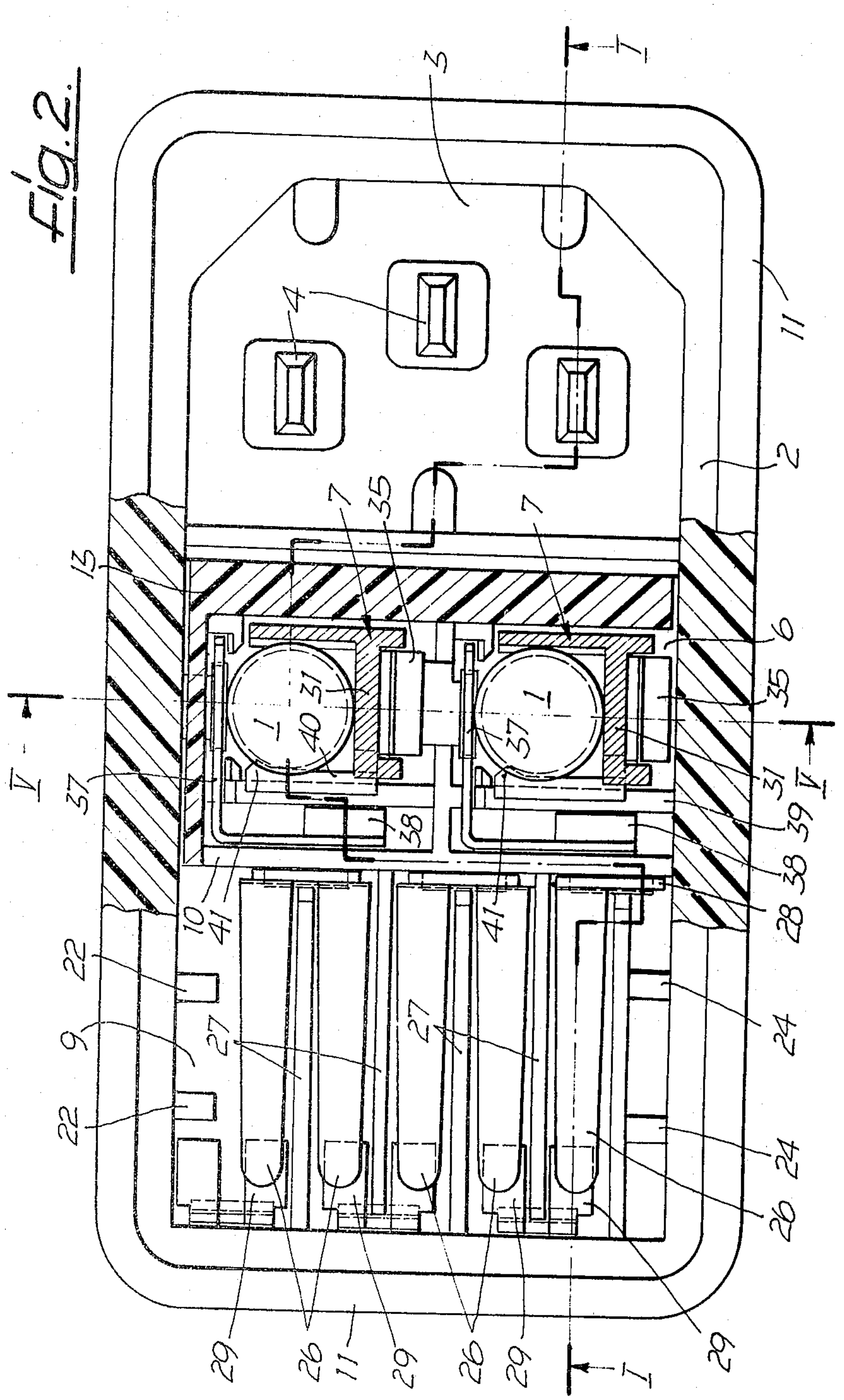
FIG. 2 is a cross-section diagram along line II—II of FIG. 1 with the pressure hull of the voltage selector being removed.

The first chamber 3, which receives the unit socket plug to be coupled with the unit plug, is followed by a second chamber 6 which serves to receive two fuse holders each identified as an entirety by 7 into which one each of the fine-wire fuses 1 can be inserted. The second chamber 6 is partially separated from the first chamber 3 by means of a partition 8 which does not extend to the upper edge of the casing 2. Because of its greater depth the second chamber 6 projects beyond the bottom of the first chamber. As shown in FIG. 2, the second chamber 6 is located between the first chamber 3 and a third chamber 9 from which it is partially separated by means of a second partition 10. The second partition 10 ends at a distance from the upper edge of the casing 2, as does the first partition 8. A circumferential bead 11 projects towards the outside of the casing 2 near to its upper edge as do elastic crosspieces 12 which serve to fix the casing 2 in a support opening of a casing or such (not shown).

The second chamber 6 and the third chamber 9 can be closed off by means of a cover 13 which consists of a plastic material. The cover 13 is pivoted in the casing 2 above the first partition 8 by means of an axis running in parallel to this partition 8 and the bottom of the casing 2. In this fashion, the upper side of the cover is in the plane defined by the upper edge of the casing 2 in its closed condition. Since the pivoting axis is provided at a crosspiece of the cover which extends at a distance from the rear edge of the cover at its lower side towards the bottom of the casing 2, the rear edge of the cover 13 is pivoted into the first chamber 3 when it is opened. Therefore, the cover 13 can only be opened when no unit plug socket is in place in the chamber 3 since it would form a stop for the rear edge of the cover 13, thus preventing its pivoting.

Figure 4:
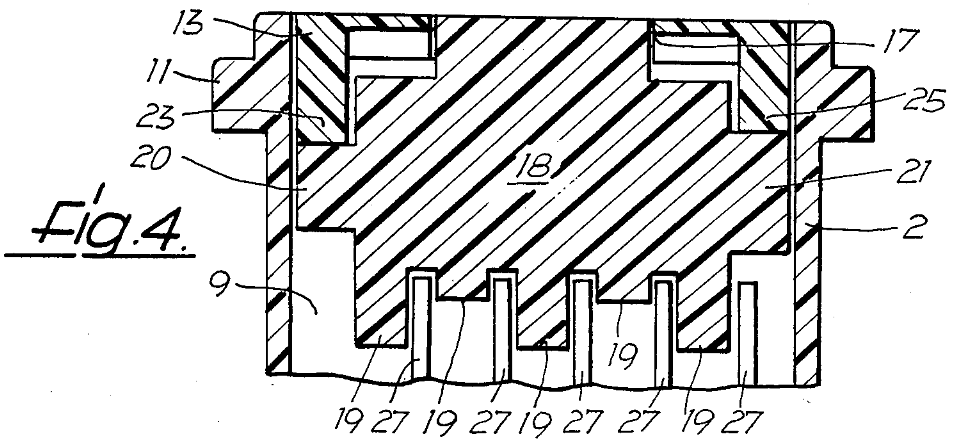
FIG. 4 is a partial cross-section diagram along line IV—IV of FIG. 1.
Figure 5:
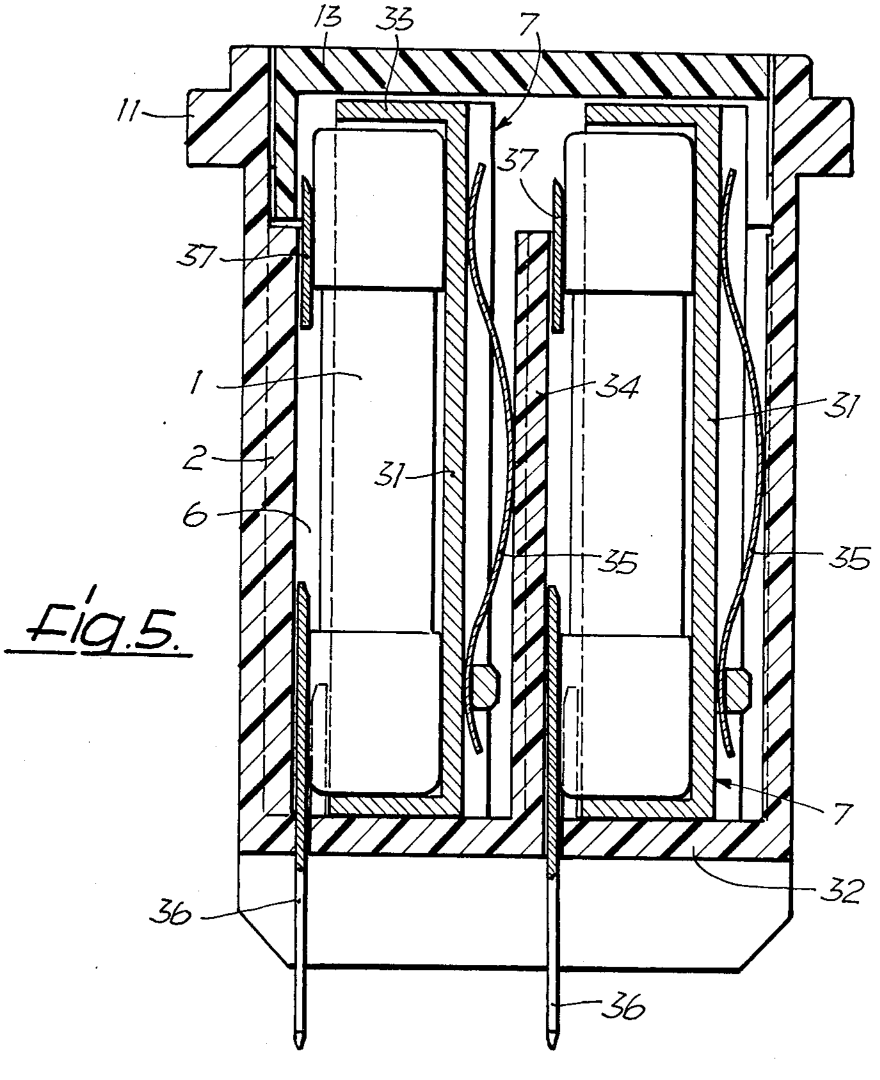
FIG. 5 is a cross-section diagram along line V—V of FIG. 2.

An elastic closing strap 14 is attached to the front end of the cover as is shown in FIG. 3 which extends downward and carries a nose 16 projecting towards the lateral casing wall. When the cover is closed, the nose 16 engages a recess 15 of the casing wall in a pressure-locked manner. In the area of the third chamber 9, the cover 13 has a window 17, as is shown in FIGS. 1 and 4. The two fringe zones of the window 17 running in transverse direction also have a reduced wall thickness so that the window opening on the lower side of the cover when measured in the longitudinal direction of the cover is considerably larger than on the upper side of the cover.

The reason for this particular shape of the window 17 is because of the fact that a roller-like pressure hull (actuating member) 18 is horizontally arranged in the third chamber 9. The longitudinal axis of the pressure hull 18 consists of plastic material which is in parallel to the swivel axis of the cover 13. The pressure hull 18 has several annular zones next to each other in axial direction which, as is shown in FIG. 1, each form an actuation cam 19 of the same height but of a different angular position and radially opposite to it, one identification cam 19′ each. As is shown in FIG. 4, each of the journals 20 or 21 is attached to the two faces of the pressure hull 18 between whose free ends and the adjacent lateral wall of the casing 2, there is only a narrow gap so that the pressure hull 18 can shift very little in axial direction. The journal 20 shown in FIG. 4 on the left side is smaller in diameter than the journal 21, and is a round journal. It engages between two guide crosspieces 22 which are attached to the lateral wall of the casing 2 and extend from the bottom of the casing 2 close to the cover 13. The journal 20 can, therefore, assume any angular position and can be shifted in a direction from the bottom of the casing 2 to the cover 13 and vice versa.

A stop 23 is attached to the cover and engages between the guide crosspieces 22 to limit the shifting towards the cover 13, as is shown in FIG. 4. The other journal 21, which has a regular polygon contour, (in the preferred embodiment it is a regular octagon), also engages between two guide crosspieces 24 attached to the casing wall whose distance from each other is selected in such a way that it is impossible to twist the guide journal 21. A stop 25 with a plane contact surface attached to the cover engages between the guide crosspieces 24 and limits the possibility of the guide journal 21 shifting towards the cover in longitudinal direction of the guide crosspieces 24. Therefore, the stops 23 and 25 keep the pressure hull at the proper distance from the bottom of the chamber 9. The pressure hull 18 is prevented from twisting in the chamber 9 by means of the guide crosspieces 24.

The individual annular zones of the pressure hull 18 with the cams 19 and 19′ are aligned with one elastic contact tongue 26. Each tongue 26, as is shown in FIG. 1, extends from the partition 10 limiting the third chamber 9 towards the second chamber 6 at a distance from the chamber bottom towards the opposite chamber wall. The contact tongues 26, which have a shape forming a cam towards the pressure hull 18, as is shown in FIG. 1, are separated from each other by means of partitions 27 which are attached to the chamber bottom and between which the cams 19 can engage. The stationary end of each contact tongue 26 is welded to a flat contact plug 28 penetrating the chamber bottom. The free end of each contact tongue 26 is aligned with a counter-contact piece 29 assigned to it which is formed by one shank of an angular contact piece penetrating the chamber bottom. As is shown in FIG. 2, five of these contact tongues 26 are arranged in the third chamber 9 in the embodiment shown. Each of these contact tongues 26 can be pushed into a position towards the chamber bottom by means of the cams 19 in which their free ends rest against the assigned counter-contact 29. The cams 19 are arranged and designed in such a way that another combination of the individual contact tongues 26 rests against the assigned counter-contact pieces 29 in each of the selectable angular positions of the pressure hull 18. The return force of the actuated contact tongues 26 pushes the journals 20 and 21 against the stops 23 or 25. In order to be able to place the pressure hull 18 into another angular position and to select another voltage, the cover 13 must be opened and the pressure hull 18 must be removed of the chamber 6.

In order to be able to recognize the angular position of the pressure hull 18 and thus the selected voltage, means such as data carriers identifying the selected voltage are contained on the jacket surface of the identification cams 19′, one of which is always visible through the window 17. Thus, the window 17 shows always only the identification means assigned to that turned position.

The two fuse holders 7, designed in the same way in the embodiment shown, are arranged next to each other in the second chamber 6 in the direction of the axis of rotation of the cover 13. They are, in accordance with the shape of the fine-wire fuses 1, elongated, one-piece containers of plastic material of a squared shape whose longitudinal axis is perpendicular to the chamber bottom in the condition in which they are used.

Two of the lateral walls 31 of the fuse holder 7, which are adjacent to each other and in parallel to the longitudinal axis, extend from its bottom 32 to the upper boundary wall 33 opposite to the latter. On the outside of one of these two lateral walls 31, i.e., that one which is towards one of the lateral walls of the casing or towards a partition 34 running in parallel to it, a journal is attached which fixes one end of a bent plate spring 35 which attempts to push the fuse holder away from the lateral casing wall or from the partition 34. The fuse holder 7 is open on the side opposite to this lateral wall so that the fuse holder can always push the two contact caps of the fine-wire fuse inserted in it against one flat contact piece 36 or 37 fixed in the second chamber 6. The two flat contact pieces 36 which serve to contact the contact cap of the two fine-wire fuses 1 resting on the bottom of the fuse holder 7 are introduced into the second chamber 6 through the bottom thereof. The contact pieces 36 broaden towards their ends resting in the chamber in the embodiment shown to a width corresponding approximately to the diameter of the contact caps as is shown in FIG. 1. The two other flat contact pieces 37 are formed by one shank of an angle whose other shank follows a flat rail 38 introduced into the chamber through the chamber bottom and can rest on the partition to the third chamber 9 as is shown in FIG. 1.

The longitudinal side of the fuse holder 7 along the open lateral wall 31 and the lateral wall 31 acted upon by the plate spring 35 is only partially closed. A partition 39 extends from the bottom 32 over about ⅓ of the length of the fuse holder. In addition to this partition 39, the fuse holder 7 is limited on this longitudinal side, in part, by means of a tongue 40 arranged at about half the height of the fuse holder 7. This tongue 40 extends, separately and away from the wall 39, from the lateral wall 31 towards the open side of the fuse holder. It has a nose 41 on its free end which points towards the inside, as is shown in FIG. 2. As can also be seen from FIG. 2, this nose 41 prevents the fine-wire fuse 1 from dropping out of the fuse holder 7 towards its open side. For fine-wire fuses with smaller diameters, the dimensions of the inner space of the fuse holder are selected to be correspondingly smaller. However, the outside dimensions of the fuse holder remain the same.

Since the cover 13 closes off the second chamber 6, an exchange of fuses is only possible when there is no unit plug socket in the first chamber 3 and the cover can, therefore, be swung fully open. In order to insert a fuse, it is to be placed only in the fuse holder 7 and the latter is then inserted into one of the two compartments of the second chamber 6 until it comes to rest on the bottom of the chamber by its own bottom. The plate spring 35 then guarantees a good contact between the contact caps of the fuse and the flat contact pieces 36 and 37 whose dimensions and, particularly, whose lengths, have been selected in such a way that they contact the lower contact cap of a long as well as of a short fine-wire fuse. The changing of a fuse is just as simple. For this purpose, only the corresponding fuse holder 7 need be taken out after having opened the cover 13, be equipped with another fine-wire fuse and inserted again. The fuse holders 7 can be optionally equipped with fuses of European design or of U.S. design.

Although only a preferred embodiment is specifically illustrated and described herein, it will be appreciated that many modifications and variations of the present invention are possible in light of the above teachings and within the purview of the appended claims without departing from the spirit and intended scope of the invention.

I claim:

1. A plug for an electrically operated device combined with a voltage selector and a fuse supporting device to form one component, comprising: said voltage selector having a roller-like actuating member which is rotatably adjustable to different angular positions;

said voltage selector further including movable contact and counter-contact pieces, said contact pieces, depending upon the angular position of said actuating member, are held in different combinations by said actuating member against appropriate counter-contact pieces of said voltage selector for actuating different combinations of contact pieces for different voltages;

said fuse supporting device has at least one fuse holder, exchangeably mounted in the fuse supporting device, for holding a fine-wire fuse; and said fuse supporting device further having contact pieces against which the contact caps of said fine-wire fuse rest when said fine-wire fuse is inserted into said fuse holder.

2. The plug of claim 1, further including a joint cover and a joint casing with chambers to receive contact elements which can be coupled with a unit plug socket, and in which the fuse supporting device and the voltage selector are open towards the same side and in which the fuse supporting device and the voltage selector can be at least partially closed by means of the joint cover.

3. The plug of claim 2, wherein said cover is pivoted in the casing and has a lock preventing its opening when the plug socket is introduced.

4. The plug of claim 3, wherein said lock is formed by a projection of the cover which pivots into the chamber to receive the plug socket with the opening.

5. The plug of claim 2, wherein the movable contact pieces of the voltage selector are flexible contact tongues, have a reaction force directed against the open side of the chamber containing the actuating member and the actuating member rests on the cover.

6. The plug of claim 5, further comprising data carriers, wherein the cover has a window aligned with the actuating member in which one of several data carriers of the actuating member is always visable and always contains an identification of the selected voltage.

7. The plug of claim 3, further including at least one elastic closing strap attached to the cover having a nose engaging in a notch of the casing when the cover is being closed.

8. The plug of claim 1, wherein the actuating member has a number of annular zones with actuation cams corresponding to the number of the movable contact pieces which can be actuated as well as an annular zone securing it in the selected angular position by means of notch surfaces.

9. The plug of claim 2, wherein the chamber of the casing for the fuse supporting device is designed to receive two fuse holders arranged next to each other and has a pair of contacts for each fuse holder.

10. The plug of claim 9, wherein the fuse holder is a square-shaped hollow body comprised of plastic material with openings for the engagement of the contact pieces of the assigned pair of contacts and for the insertion as well as removal of the fine-wire fuse.

11. The plug of claim 10, further including a spring acting upon the fuse holder for pushing the fuse holder against the contact pieces.

12. The plug of claim 9, wherein the contact pieces have a size which is sufficient for the contacting of fuses of different sizes.

13. The plug of claim 2, wherein the chamber for the fuse supporting device is located between the chamber for the voltage selector and the chamber serving to receive the plug socket.

14. The plug of claim 13, wherein each fuse holder is arranged in the chamber in a position in which the longitudinal axis of the holder is in parallel to the insertion direction of the plug socket.

15. An electrical plug, combined in one unit with a voltage selecting switch and a fuse support, comprising a common casing and a cover for said casing;

said voltage selecting switch comprises a rotary actuating member, contact elements, and counter-contact elements, wherein said actuating member is adjustable to different angular positions for actuating different combinations of contact and counter-contact elements associated with different selectable voltages;

said fuse support comprising at least one interchangeable fuse holder;

wherein said plug, switch, and fuse support are all contained within said casing.

16. The plug of claim 15, wherein said cover is pivoted in the casing and has a lock preventing its opening when a socket is introduced.

17. The plug of claim 15, further comprising identifying means wherein the cover has a window aligned with the actuating member in which one of several identifying means of the actuating member is always visible and always contains an identification of the selected voltage.

18. The plug of claim 15, wherein the actuating member has a number of annular zones with actuation cams corresponding to the number of the movable contact pieces which can be actuated as well as an annular zone securing it in the selected angular positions by means of notch surfaces.

19. The plug of claim 15, wherein the casing is designed to receive two fuse holders arranged next to each other and has a pair of contacts for each fuse holder.

* * * * *